United States Patent
Asahi

[19]

[11] Patent Number: 6,023,359
[45] Date of Patent: Feb. 8, 2000

[54] OPTICAL WAVELENGTH-DIVISION MULTIPLEX TRANSMISSION EQUIPMENT WITH A RING STRUCTURE

[75] Inventor: Koji Asahi, Tokyo, Japan

[73] Assignee: Nec Corporation, Tokyo, Japan

[21] Appl. No.: 08/898,109

[22] Filed: Jul. 22, 1997

[30] Foreign Application Priority Data

Oct. 4, 1996 [JP] Japan ..................................... 8-264361

[51] Int. Cl.⁷ .......................... H04B 10/08; H04B 10/20
[52] U.S. Cl. .......................................... 359/119; 359/110
[58] Field of Search .................................. 359/110, 118, 359/119, 125

[56] References Cited

U.S. PATENT DOCUMENTS

| | | | |
|---|---|---|---|
| 5,680,235 | 10/1997 | Johansson | 359/110 |
| 5,717,796 | 2/1998 | Clendening | 385/24 |
| 5,864,414 | 1/1999 | Barnsley et al. | 359/125 |

FOREIGN PATENT DOCUMENTS

| | | |
|---|---|---|
| 2-56130 | 2/1990 | Japan . |
| 3-83428 | 4/1991 | Japan . |
| 5-100254 | 4/1993 | Japan . |
| 5-102928 | 4/1993 | Japan . |
| 5-316043 | 11/1993 | Japan . |
| 6-97950 | 4/1994 | Japan . |
| 6-209284 | 7/1994 | Japan . |
| 6-216921 | 8/1994 | Japan . |
| 6-244796 | 9/1994 | Japan . |
| 6-268604 | 9/1994 | Japan . |
| 7-231305 | 8/1995 | Japan . |
| 7-321745 | 12/1995 | Japan . |
| 8-46570 | 2/1996 | Japan . |
| 8-184719 | 7/1996 | Japan . |
| 8-237221 | 9/1996 | Japan . |

OTHER PUBLICATIONS

Japanese Office Action dated Aug. 3, 1999, with English language translation of Japanese Examiner's comments.

Japanese Office Action, dated Jun. 1, 1999, with English Language Translation of Japanese Examiner's comments.

*Primary Examiner*—Jason Chan
*Assistant Examiner*—Dalzid Singh
*Attorney, Agent, or Firm*—Whitham, Curtis & Whitham

[57] ABSTRACT

In optical wavelength-division multiplex transmission equipment where a plurality of nodes are connected in the form of a ring, the nodes are connected by four optical fiber transmission lines consisting of a pair of working transmission lines and a pair of protection transmission lines which are capable of bidirectional optical transmission. Four different optical information signals are sent onto four transmission lines by the transmission wavelengths assigned individually to a plurality of nodes, and a desired single wavelength is separated and extracted from the optical signals that are received from the transmission line. The optical signals consisting of the other wavelength components are multiplexed with the aforementioned transmission wavelength and are sent onto the ring-shaped transmission line again. Since a single wavelength component is assigned to each node, there is no need to set protection wavelengths, and all wavelengths can be used as service wavelengths. When an obstacle occurs on the transmission lines, both a clockwise route and a counterclockwise route can be used by switching the working transmission lines to the protection transmission lines at both the transmitting side and the receiving side. In this way, the transmission efficiency and reliability in the optical transmission equipment with a ring structure can be enhanced.

21 Claims, 14 Drawing Sheets

OPTICAL WAVELENGTH-DIVISION MULTIPLEX TRANSMISSION EQUIPMENT WITH A RING STRUCTURE

BACKGROUND OF THE INVENTION

1. Field of the Invention

The present invention relates to optical transmission equipment with a ring structure where a plurality of nodes are connected in the form of a ring by transmission lines. More particularly, the invention relates to optical transmission equipment which employs a wavelength division multiplexing technique to transmit wavelengths multiplexed by wavelength division onto the working and protection transmission lines in both directions.

2. Description of the Related Art

In optical transmission equipment where a plurality of nodes are interconnected by optical transmission lines, there is known the structure where each node employs a service wavelength and a protection wavelength and where the wavelengths are multiplexed by optical wavelength division to transmit identical information signals in opposite directions. Conventional optical transmission equipment is constituted by optical fibers for interconnecting nodes, an optical signal wavelength transmission section for transmitting an optical signal of a wavelength, which corresponds to the information to be transmitted from each node, onto the optical fiber, and a wavelength selecting section for suitably selecting and receiving information (a desired wavelength) from optical signals of wavelengths.

In each node, a service wavelength is selectively received from optical signals being wavelength multiplexed and transmitted. For example, suppose that a service wavelength is represented by $\lambda s$ and a protection wavelength by $\lambda p$. The optical signals with these wavelengths assigned thereto are transmitted through optical fibers in opposite directions. If an obstacle occurs, the node incapable of receiving the service wavelength will switch the service wavelength to the protection wavelength and receive transmitted information.

Each node is provided with a wavelength transmitting section and a wavelength selecting section. The wavelength transmitting section is employed when the node receives information from the optical fiber, and when the node transmits information, the wavelength transmitting section outputs both service wavelength $\lambda s$ and protection wavelength $\lambda p$. That is, in the wavelength transmitting section, the wavelengths are multiplexed and transmitted onto the optical fiber. The same information signals are transmitted by the service wavelength and the protection wavelength, respectively.

The service wavelength and the protection wavelength are transmitted through the optical fiber in the aforementioned opposite directions, respectively. In a normal state, the wavelength selecting section of each node selectively receives the service wavelength $\lambda s$ from the signals being wavelength multiplexed and transmitted. In this way, communication is established between nodes.

When an obstacle occurs in the conventional optical transmission equipment, for example, when an obstacle occurs between nodes, the node downstream of the obstacle point with respect to the service wavelength $\lambda s$ becomes incapable of receiving information. In this case, at the aforementioned node, the wavelength to be selected is switched from the service wavelength $\lambda s$ to the protection wavelength $\lambda p$ by the wavelength selecting section.

As previously described, the information that is transmitted by the protection wavelength $\lambda p$ is the same as the information that is transmitted by the service wavelength $\lambda s$, and only the directions in which the wavelengths are transmitted are opposite. Since the transmission directions are opposite, there are cases where a certain node is positioned upstream of the obstacle point with respect to the protection wavelength $\lambda p$. Therefore, it is possible for the node to receive the protection wavelength $\lambda p$. In this way, the communication is continued.

However, there are cases where for the service wavelength $\lambda s$, a certain node is positioned downstream or upstream of the obstacle point with respect to the information that the node transmits to another node. In such cases it is impossible to receive the service wavelength $\lambda s$ with respect to the information that a downstream node transmits.

Therefore, in the node in which an obstacle occurs, the service wavelength $\lambda s$ and the protection wavelength $\lambda p$ are selectively used as usual with respect to the information that another node transmits. That is, with respect to the service wavelength $\lambda s$, depending on whether or not a node can receive the information that another node transmits, each node selects the service wavelength $\lambda s$ when the information can be received, and selects the protection wavelength $\lambda p$ when the information cannot be received. In this way, communication can be continued even when an obstacle occurs on the transmission line.

In the conventional optical transmission equipment, as previously described, both the service wavelength $\lambda s$ and the protection wavelength $\lambda p$ are set to the wavelength that is transmitted from each node, and the number of nodes needs to be twice the number of wavelengths. The conventional optical transmission equipment, therefore, has the disadvantage that the wavelength band to be used has to be widened and that a great number of wavelengths have to be set to the wavelength selecting section.

Additionally, the conventional optical transmission equipment has the disadvantage that wavelength components and fibers cannot be effectively used, because identical information signals are transmitted in both a clockwise direction and a counterclockwise direction.

SUMMARY OF THE INVENTION

The object of the optical wavelength-division multiplex transmission equipment with a ring structure of the present invention is to provide optical transmission equipment which effectively uses wavelength components, has high transmission efficiency, and is excellent in reliability and operability.

The optical wavelength-division multiplex transmission equipment with a ring structure of the present invention comprises n nodes and four pairs of optical fiber transmission lines for connecting these n nodes in the form of a ring, as a first structure. The four pairs of optical fiber transmission lines are connected to the n nodes, respectively. The optical transmission equipment further comprises four wavelength multiplexing/demultiplexing sections which separate an arbitrary wavelength component from received optical signals, add a wavelength component set to each node, and then send the wavelength components onto the transmission line. The optical transmission equipment further comprises a first optical 4×4-matrix switch, four optical transmitter-receivers, and a second optical 4×4-matrix switch.

The first optical 4×4-matrix switch receives four arbitrary wavelength component signals separated by the four wavelength multiplexing/demultiplexing sections and outputs the received signals to arbitrary ports of the four output ports.

The optical transmitter-receivers are connected to the four outputs of the first optical 4×4-matrix switch, respectively. Each optical transmitter-receiver receives a single optical signal and also generates and sends an optical signal of a wavelength component set to each node.

The second optical 4×4-matrix switch assigns four optical signals, which are output from the four optical transmitter-receivers, to the aforementioned four wavelength multiplexing/demultiplexing sections and then outputs a wavelength insertion signal. A control section controls the wavelength components separated by the aforementioned four wavelength multiplexing/demultiplexing sections and also controls the connection states of the first and second optical 4×4-matrix switches.

The optical wavelength-division multiplex transmission equipment with a ring structure of the present invention comprises n nodes, two pairs of optical fiber transmission lines connected in the form of a ring to these n nodes for transmitting optical signals in clockwise and counterclockwise directions, four optical circulators, and four wavelength multiplexing/demultiplexing sections, as a second structure.

The optical circulator inputs an optical signal, received from the optical fiber transmission line, to the n nodes and outputs an optical signal, sent from the node, onto the optical fiber transmission line. The wavelength multiplexing/demultiplexing sections receive optical signals through the four optical circulators from the optical fiber transmission lines. An arbitrary wavelength component is separated from the received optical signals, and a wavelength component set to each node is added. Then, the wavelength components are sent onto the transmission lines again.

The second structure further comprises a first optical 4×4-matrix switch, four optical transmitter-receivers, and a second optical 4×4-matrix switch. The first optical 4×4-matrix switch receives four arbitrary wavelength component signals separated by the four wavelength multiplexing/demultiplexing sections and outputs the received signals to arbitrary ports of the four output ports. The optical transmitter-receivers are connected to the four outputs of the first optical 4×4-matrix switch, respectively. Each optical transmitter-receiver receives a single optical signal and also generates and sends an optical signal of a wavelength component set to each node. The second optical 4×4-matrix switch assigns four optical signals, which are output from the four optical transmitter-receivers, to the aforementioned four wavelength multiplexing/demultiplexing sections and then outputs a wavelength insertion signal. A control section controls the wavelength components separated by the aforementioned four wavelength multiplexing/demultiplexing sections and also controls the connection states of the first and second optical 4×4-matrix switches.

Furthermore, the optical wavelength-division multiplex transmission equipment with a ring structure of the present invention comprises n nodes shown in the first embodiment, four pairs of first optical fiber transmission lines which constitute a first ring structure connected in the form of a ring to these n nodes, m nodes shown in the second embodiment, four pairs of second optical fiber transmission lines which constitute a second ring structure connected in the form of a ring to these m nodes, and two adjacent ring connecting nodes connected to the first ring structure and the second ring structure.

In the above arrangement, a first set of four wavelength multiplexing/demultiplexing sections are connected to four pairs of first optical fiber transmission lines which constitute a first ring structure, respectively. In each wavelength multiplexing/demultiplexing section, an arbitrary wavelength component is separated from the received optical signals, and a wavelength component set to each node is added. Then, the wavelength components are sent onto the transmission lines again. A second set of four wavelength multiplexing/demultiplexing sections are connected to four pairs of second optical fiber transmission lines which constitute a second ring structure, respectively. In each wavelength multiplexing/demultiplexing section, an arbitrary wavelength component is separated from the received optical signals, and a wavelength component set to each node is added. Then, the wavelength components are sent onto the transmission lines again.

The optical transmission equipment of the present invention is further provided with a third optical 4×4-matrix switch, a fourth optical 4×4-matrix switch, and a fifth optical 4×4-matrix switch.

The third optical 4×4-matrix switch receives four arbitrary wavelength component signals separated by a first set of four wavelength multiplexing/demultiplexing sections, and selectively connects the four signals. Then, wavelength signals for insertion are output to a second set of four wavelength multiplexing/demultiplexing sections. The fourth optical 4×4-matrix switch receives four arbitrary wavelength component signals separated by a second set of four wavelength multiplexing/demultiplexing sections, and selectively connects the four signals. Then, wavelength signals for insertion are output to a second set of four wavelength multiplexing/demultiplexing sections. The wavelength components separated by the first and second wavelength multiplexing/demultiplexing sections and the connection states of the third and fourth optical 4×4-matrix switches are controlled by a control section.

In the first structure of the optical wavelength-division multiplex transmission equipment with a ring structure of the present invention, a single wavelength component is assigned to each node and sent onto four optical fiber transmission lines. For this reason, all wavelength components can be used as service wavelengths without setting protection wavelengths. Therefore, wavelength components can be effectively used. Additionally, the wavelength band to be used can be minimized. Furthermore, the number of selected wavelengths in the wavelength selecting section can be minimized.

When a transmission line fails, both a clockwise route and a counterclockwise optical route can be employed by selecting protection transmission lines at both the transmitting side and the receiving side, so that the first structure is excellent in reliability. Furthermore, since the protection transmission lines can transmit low-priority signals in a normal state, the transmission efficiency can be enhanced.

In the second structure of the optical wavelength-division multiplex transmission equipment with a ring structure of the present invention, clockwise and counterclockwise optical signals are multiplexed and demultiplexed by the optical circulator. Therefore, in addition to the advantage of the first structure, the number of transmission lines to be used can be reduced by half, and the transmission efficiency can be further enhanced.

In the optical wavelength-division multiplex transmission equipment with a ring structure of the present invention, two optical ring systems can be interconnected without reducing reliability, in addition to the operation in the first structure. Therefore, the present invention can construct flexible networks and is excellent in operability.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Before describing in detail optical wavelength-division multiplex transmission equipment with a ring structure of the present invention, a conventional optical transmission equipment will initially be described for making understanding of the present invention easy.

Figure 1:
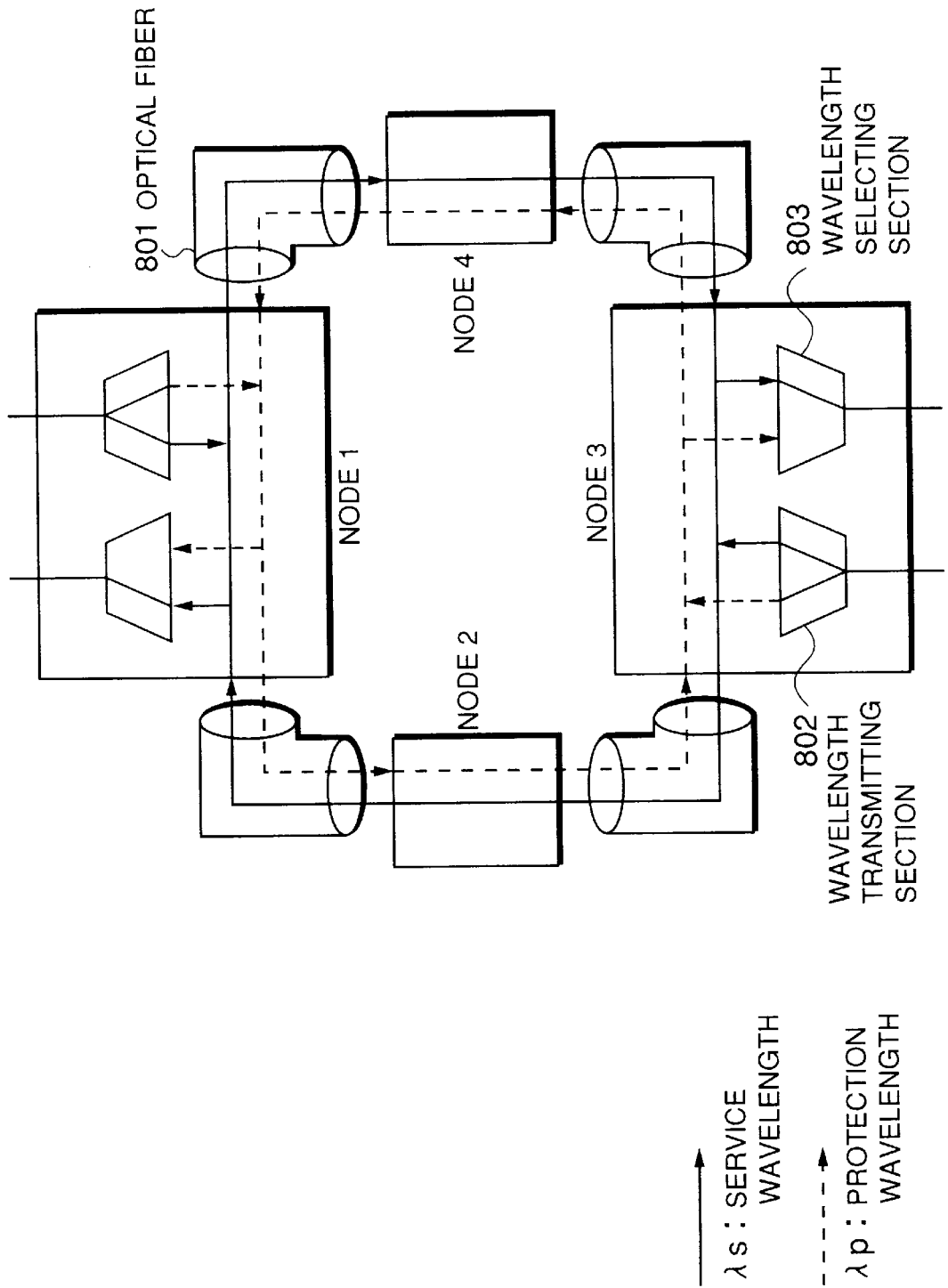
FIG. 1 is a schematic view showing conventional optical transmission equipment with a ring structure.

FIG. 1 shows conventional optical transmission equipment with a ring structure. FIG. 1 is an example of optical transmission equipment using 4 nodes, and each node employs a service wavelength and a protection wavelength. Identical information signals are wavelength-division multiplexed and the signals are transmitted in opposite directions.

In FIG. 1, 801 is an optical fiber, 802 a wavelength transmitting section, and 803 a wavelength selecting section. Each node selectively receives a service wavelength from the signals being wavelength multiplexed and transmitted. The service wavelength $\lambda s$ is represented by a solid line and the protection wavelength $\lambda p$ by a dotted line. The optical signals of the service and protection wavelengths are transmitted through the optical fiber 801 in opposite directions. Here, suppose that the service wavelength $\lambda s$ is transmitted in a clockwise direction and the protection wavelength $\lambda p$ is transmitted in a counterclockwise direction. If an obstacle occurs, the node incapable of receiving the service wavelength will select the protection wavelength to receive information that is transmitted.

Through the optical fiber 801, two kinds of optical signals having both service wavelength $\lambda s$ and protection wavelength $\lambda p$ are wavelength multiplexed and transmitted.

Each node is provided with the wavelength transmitting section 802 and the wavelength transmitting section 803. The wavelength transmitting section 803 is employed when the node receives information from the optical fiber 801, and when the node transmits information, the wavelength transmitting section 802 outputs both service wavelength $\lambda s$ and protection wavelength $\lambda p$. That is, in the wavelength transmitting section 802, the wavelengths are multiplexed and transmitted onto the optical fiber 801. At this time, the identical information signals are transmitted by the service wavelength and the protection wavelength. The service wavelength and the protection wavelength are transmitted through the optical fiber 801 in the aforementioned opposite directions, respectively. In a normal state, the wavelength selecting section 803 of each node selectively receives the service wavelength $\lambda s$ from the signals being wavelength multiplexed and transmitted. In this way, communication is established between nodes.

Figure 2:
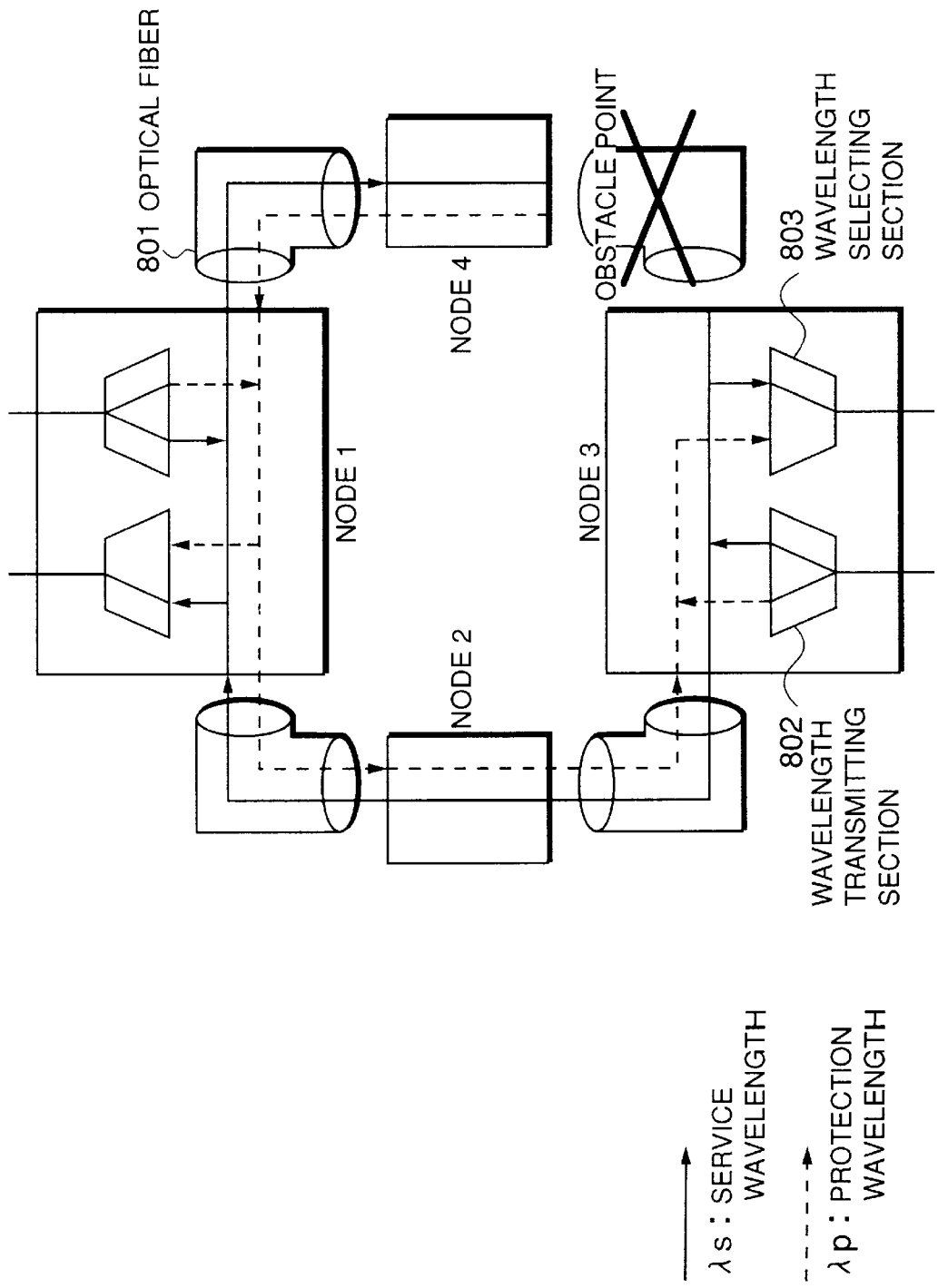
FIG. 2 is a schematic view showing the obstacle processing operation of the conventional optical transmission equipment shown in FIG. 1.

FIG. 2 shows how the conventional optical transmission equipment of FIG. 1 is operated when an obstacle occurs. For example, when an obstacle occurs between nodes 3 and 4, the node 3 downstream of the obstacle point with respect to the service wavelength $\lambda s$ becomes incapable of receiving information. In this case, at the node 3, the wavelength to be selected is switched from the service wavelength λs to the protection wavelength λp by the wavelength selecting section 803.

As previously described, the information that is transmitted by the protection wavelength λp is the same as the information that is transmitted by the service wavelength λs, and only the directions in which information signals are transmitted are opposite. Since the transmission directions are opposite, node 3 is positioned upstream of the obstacle point with respect to the protection wavelength λp, and consequently, it is possible for node 3 to receive the protection wavelength λp. In this way, the communication is continued.

For the service wavelength λs, node 2 is positioned downstream of the obstacle point with respect to the information that node 1 transmits. On the other hand, node 2 is positioned upstream of the obstacle point with respect to the information that node 3 transmits. Therefore, node 2 can receive the service wavelength λs as usual, with respect to the information that node 3 transmits, and cannot receive the service wavelength λs with respect to the information that node 1 transmits. In such a case, node 2 selects the service wavelength λs as usual with respect to the information that node 3 transmits, and node 1 selects the protection service λp with respect to the information to be transmitted. The same operation as this node 2 is also performed in node 4.

Thus, with respect to the service wavelength λs, depending on whether or not each node can receive the information that the other nodes transmit, the service wavelength λs is selected in the case where the information can be received, and the protection wavelength λp is selected in the case where it cannot be received. In this way, communication can be continued even when an obstacle occurs on the transmission line.

In the conventional optical transmission equipment, as previously described, each node needs to transmit the service wavelength λs and the protection wavelength λp, and the number of nodes needs to be twice the number of wavelengths. The conventional optical transmission equipment, therefore, has the disadvantage that the wavelength band to be used has to be widened and that a great number of wavelengths have to be set to the wavelength selecting section.

The conventional optical transmission equipment has the further disadvantage that wavelength components and fibers cannot be effectively used, because identical information signals are transmitted in both a clockwise direction and a counterclockwise direction.

Now, optical wavelength-division multiplex transmission equipment with a ring structure according to the present invention will be described in detail in reference to the drawings.

Figure 3:
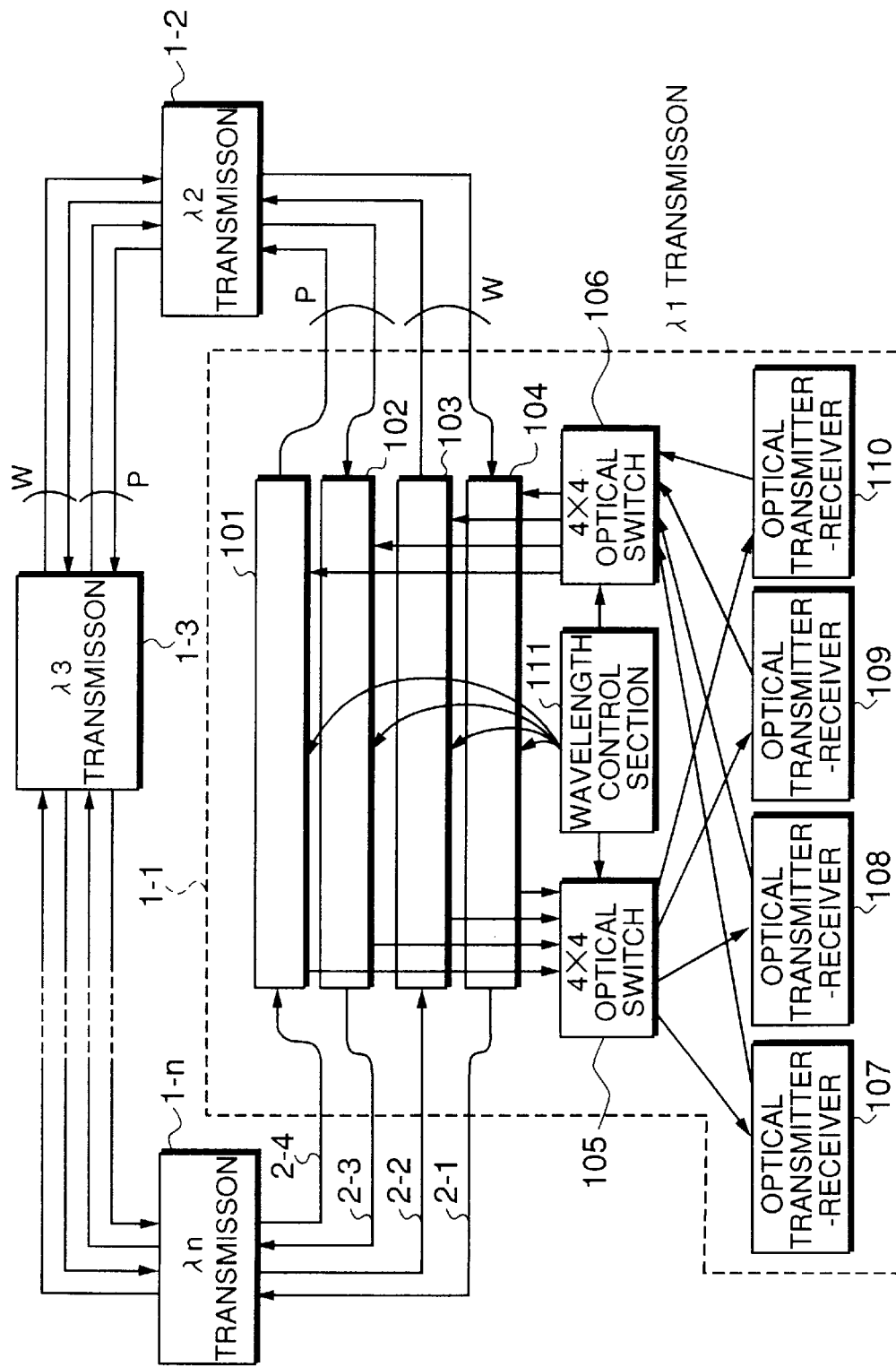
FIG. 3 is a schematic view showing a first embodiment of optical wavelength-division multiplex transmission equipment with a ring structure of the present invention.

FIG. 3 shows a first embodiment of the optical wavelength-division multiplex transmission equipment with a string structure of the present invention. In the figure, reference numerals 1—1 through 1-n denote optical add/drop nodes, and reference numerals 2-1 through 2-4 denote transmission lines comprising optical fibers (2-1: clockwise working transmission line, 2—2: counterclockwise working transmission line, 2-3: clockwise protection transmission line, and 2-4: counterclockwise protection transmission line). Reference numerals 101 through 104 denote wavelength multiplexing/demultiplexing sections, 105 and 106 optical 4×4-matrix switches, and 107 through 110 optical transmission units. Reference numeral 111 denotes a wavelength control section.

Figure 4:
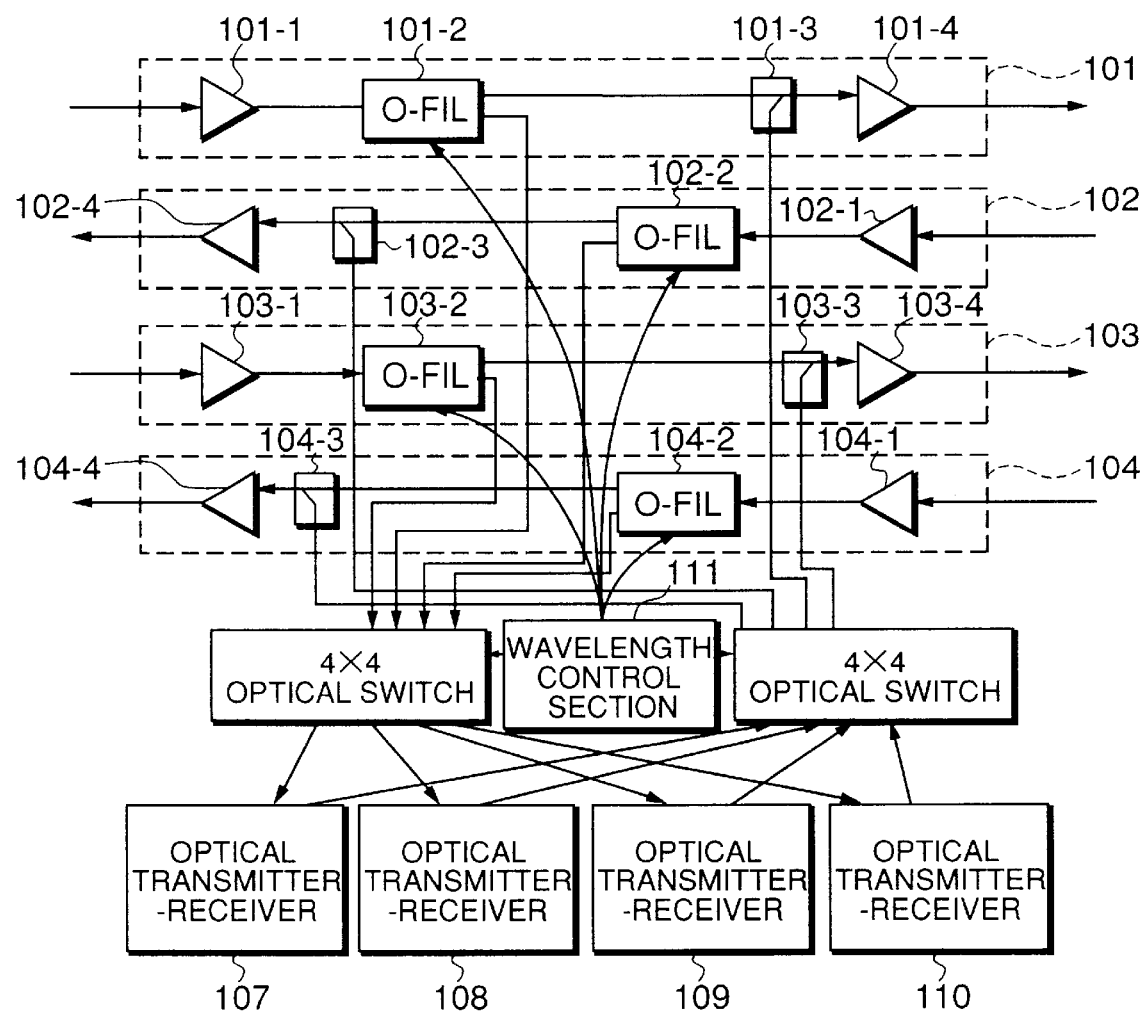
FIG. 4 is a schematic view showing the details of the wavelength multiplexing/demultiplexing section in the first embodiment of the present invention shown in FIG. 3.

FIG. 4 shows the details of the wavelength multiplexing/demultiplexing sections of FIG. 3. In FIG. 4, 101-1, 102-1, 103-1, and 104-1 denote optical amplifiers, and 101-2, 102-2, 103-2, and 104-2 denote variable wavelength filters. 101-3, 102-3, 103-3, and 104-3 denote optical couplers, and 101-4, 102-4, 103-4, and 104-4 denote optical amplifiers.

The optical fiber ring of FIG. 3 has n nodes, and adjacent stations are interconnected with four transmission lines comprising optical fibers. The four optical fibers are classified into clockwise working transmission line 2-1, counterclockwise working transmission line 2—2, clockwise protection transmission line 2-3, and counterclockwise protection transmission line 2-4, depending on the direction in which a signal advances and the applications. In nodes 1—1 through 1-n, wavelengths λ1 through λn are previously set as wavelengths that are transmitted from the nodes. For example, the four optical transmission units 107 through 110 within node 1—1 are set so as to transmit the optical signals of the wavelength λ1.

In each node, the four wavelength channel add/drop sections 101 through 104 are connected to the transmission lines 2-1 through 2-4, respectively. In FIG. 3, the wavelength channel add/drop section 101 is connected to the counterclockwise protection transmission line 2-4, the wavelength channel add/drop section 102 to the clockwise protection transmission line 2-3, the wavelength channel add/drop section 103 to the counterclockwise working transmission line 2—2, and the wavelength channel add/drop section 104 to the clockwise working transmission line 2-1.

Initially, a description will be made of an operation of sending the information of the wavelength λ1 from node 1. The optical signals of the wavelength λ1 sent from the four optical transmission units 107 through 110 in node 1 are selectively connected to the four wavelength channel add/drop sections 101 through 104 by the optical 4×4-matrix switch 106 in accordance with the control signal from the control section 111 and are input to the four wavelength channel add/drop sections 101 through 104. In the wavelength channel add/drop sections 101 through 104, the optical signals of the wavelength 11 input by the optical 4×4-matrix switch 106 are coupled with the optical signals received from the transmission lines 2-1 through 2-4 and then are output onto the transmission lines 2-1 through 2-4.

Figure 5:
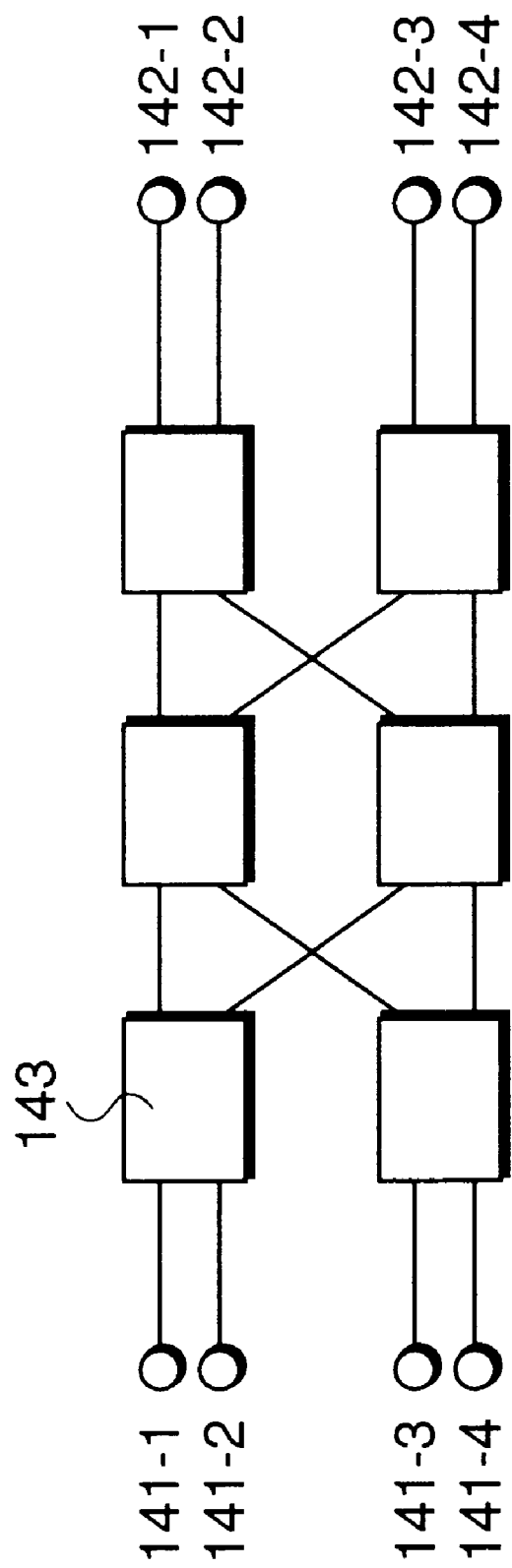
FIG. 5 is a schematic view showing an example of the optical 4×4-matrix switch in the first embodiment.

Optical 4×4-matrix switch to be used here can be constituted of various structures. An example thereof is shown in FIG. 5. In the figure, 141-1 through 141-4 are optical signal input terminals, 142-1 through 142-4 are optical signal output terminals, 143 are optical 2×2-matrix switch elements.

In FIG. 5 the four input optical signals are output to output terminals 142-1 through 142-4 by optical 2×2-matrix switch elements 143 comprising 6 in total number. The optical 2×2-matrix switch elements 143 normally employ $LiNbO_3$ material and are arranged in the form of a matrix. The switch elements 143 are interconnected with optical waveguides.

Figure 6:
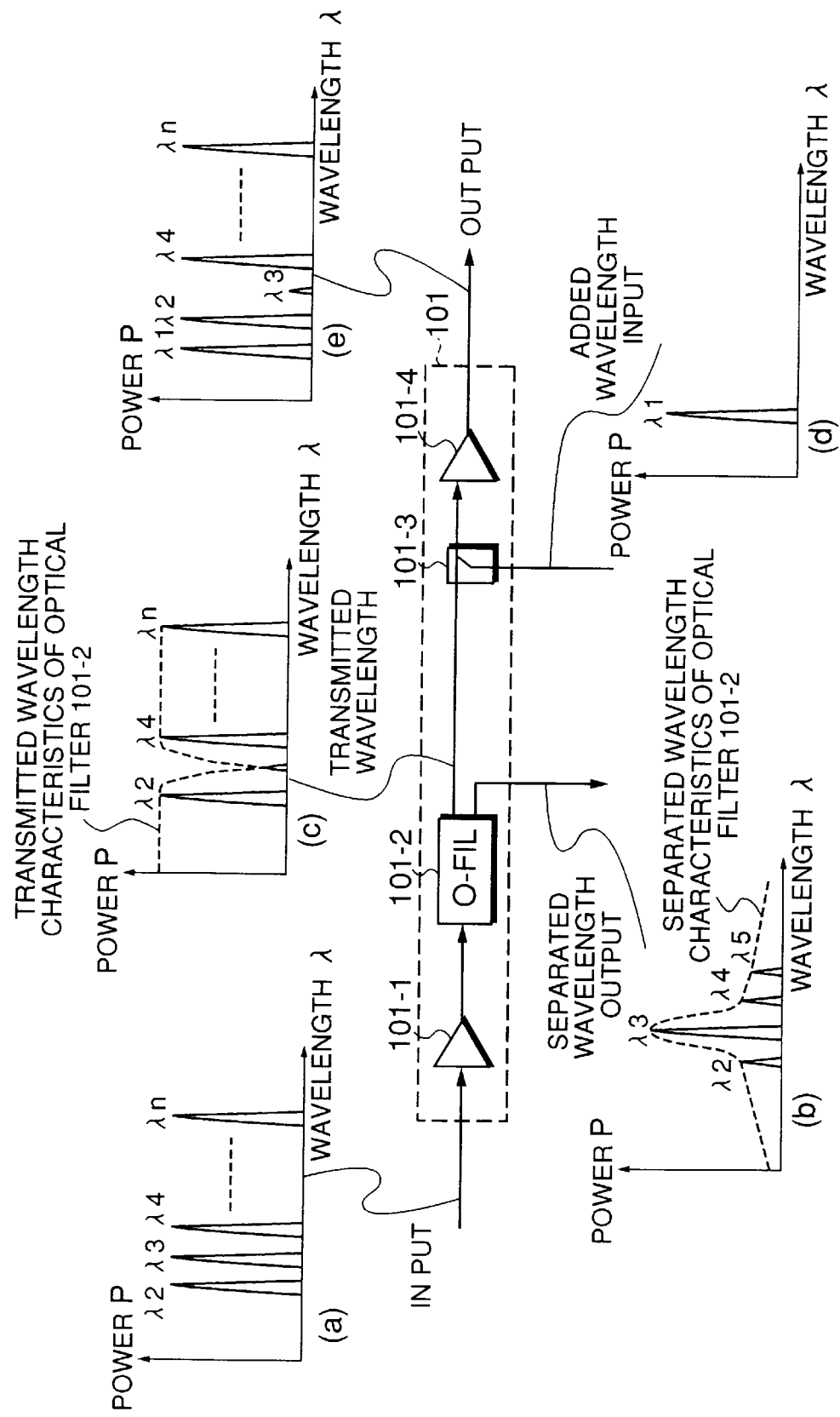
FIG. 6 is a schematic view showing the waveform of an optical signal at each part of the wavelength multiplexing/demultiplexing section shown in FIG. 4.

The detailed structures of the wavelength channel add/drop sections 101 through 104 and the operation therein will next be described in reference to FIGS. 4 and 6. FIG. 6 illustrates the waveform of the signal on each part of the wavelength channel add/drop section 101. The optical signal of the wavelength λ1 (FIG. 6(*d*)) input by the optical 4×4-matrix switch 106 is coupled with the wavelength output passed through the variable wavelength filter (101-2, 102-2, 103-2, 104-2) by the optical coupler (101-3, 102-3, 103-3, 104-3) and then is output onto the transmission line (2-1, 2—2, 2-3, 2-4) through the optical amplifier (101-4, 102-4, 103-4, 104-4) (FIG. 6(*e*)).

A description will be made of the operation where node 1—1 receives optical signals from transmission lines. As an example, a description will be made of the case where the optical signal of the wavelength λ3 sent from node 1-3 in FIG. 3 is selectively received by node 1—1. First, in the four wavelength channel add/drop sections within node 1—1, in which the wavelength-division multiplexed optical signals of the wavelength λ3 from node 1-3 are received from the transmission lines, the received optical signals (FIG. 6(a)) are optically amplified by the optical amplifier (101-1, 102-1, 103-1, 104-1) shown in FIG. 4 and then are input to the optical variable wavelength filter (101-2, 102-2, 103-2, 104-2).

The optical variable wavelength filer, on one hand, separates only the desired wavelength λ3 (FIG. 6(b)) in accordance with the control signal from the wavelength control section 111 and outputs the separated wavelength to the optical 4×4-matrix switch 105. On the other hand, the wavelengths other than the separated wavelength λ3 (FIG. 6(c)) are multiplexed with the wavelength λ1 (FIG. 6(d)) sent from the aforementioned optical transmission unit (107 through 110) through the optical coupler (101-3, 102-3, 103-3, 104-3) and the optical amplifier (101-4, 102-4, 103-4, 104-4) of the latter stage, and the coupled wavelengths (FIG. 6(e)) are sent onto the transmission lines. The four optical signals input to the optical 4×4-matrix switch 105 are connected selectively to the optical transmitter-receivers 107 through 110 in accordance with the control signal from the control section 111 and are received by the optical transmitter-receivers 107 through 110. Note that the multiplexing of the optical signals onto the transmission lines is performed by optical multiplexers such as dielectric multilayer film filters.

Figure 7:
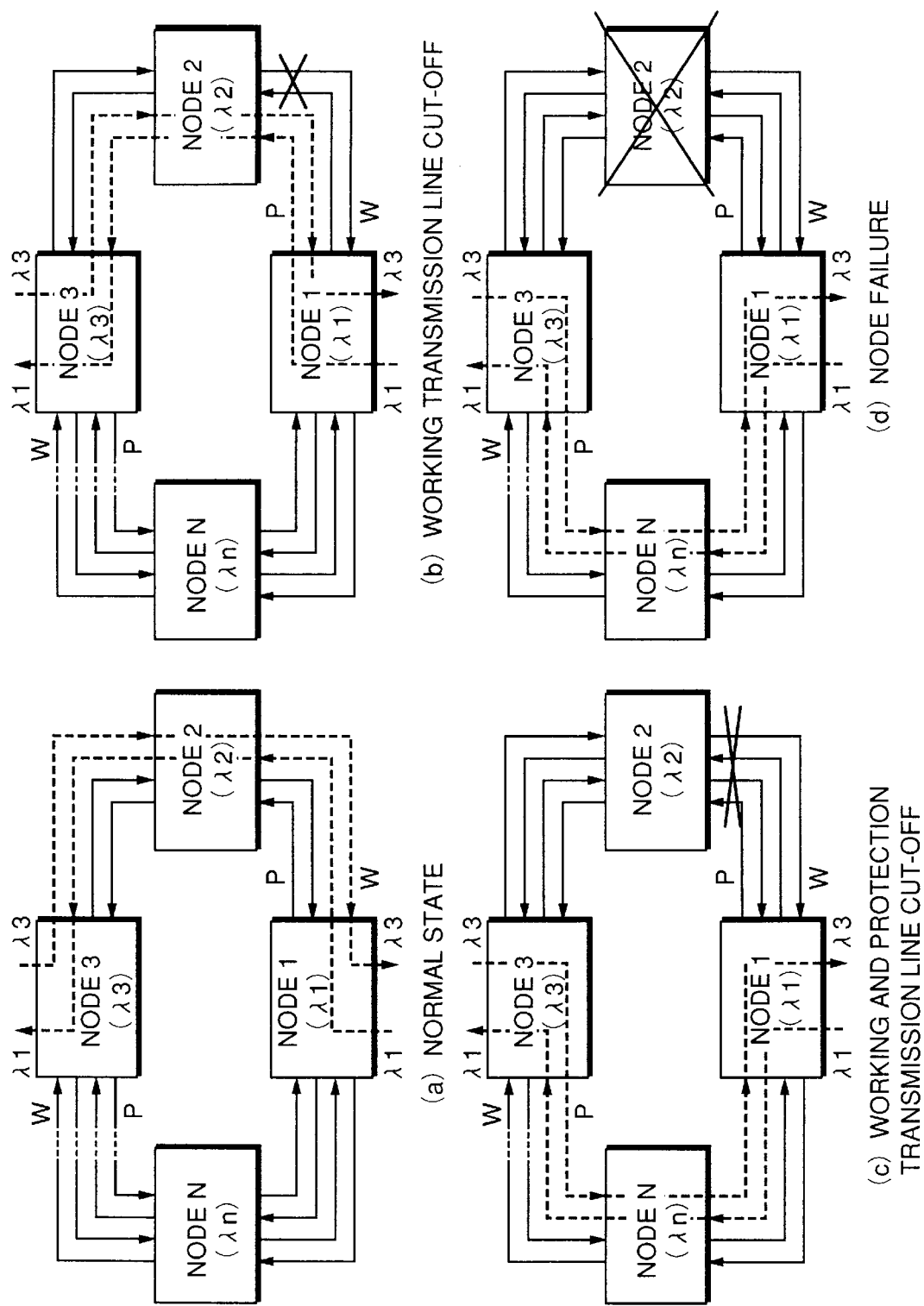
FIG. 7(a) is a schematic view showing how the communication in the first embodiment of the present invention is performed in a normal state.
FIG. 7(b) is a schematic view showing how the communication in the first embodiment is performed when the working transmission lines are cut off.
FIG. 7(c) is a schematic view showing how the communication in the first embodiment is performed when the working transmission lines and the protection transmission lines are cut off.
FIG. 7(d) is a schematic view showing how the communication in the first embodiment is performed when a certain node fails.

A description will next be made of the recovery operation of the first embodiment when an obstacle occurs on transmission lines. FIG. 7 is a diagram for describing the recovery operation.

In the normal state shown in FIG. 7(a), suppose that the optical signal of the wavelength λ1 from node 1 is transmitted and that the wavelength λ1 is selectively received by node 3. Also, suppose that, conversely, the optical signal of the wavelength λ3 is transmitted from node 3 and the transmitted wavelength λ3 is selectively received by node 1. In the normal state the service signals of the wavelengths 11 and 13 are transmitted through two pairs of working fibers (two fibers on the outer side of FIG. 7(a)) such as those shown in FIG. 7(a).

The operation in the case where two working transmission lines are cut off between node 1 and node 2 is shown in FIG. 7(b). In such a case, the optical 4×4-matrix switches 105 and 106 and the variable wavelength filter 102-2 in FIG. 4 are controlled and switched so that, in node 1, the wavelength λ1 to be transmitted is transmitted from the counterclockwise protection transmission line and that the signal of the wavelength λ3 to be received is received from the clockwise protection transmission line. In node 3, as with node 1, the same communication as the normal state can be ensured by switching the working transmission lines to the protection transmission lines.

The operation in the case where both working transmission lines and protection transmission lines are cut off between node 1 and node 2 is shown in FIG. 7(c). In this case, the optical 4×4-matrix switches 105 and 106 and the variable wavelength filter 101-2 in FIG. 4 are controlled and switched in such a manner that, in node 1, the wavelength λ1 to be transmitted is transmitted from the clockwise protection transmission line and that the signal of the wavelength λ3 to be received is received from the counterclockwise protection transmission line. In node 3, as with node 1, the same communication as the normal state can be ensured by switching the protection transmission lines in the reverse direction.

The operation in the case where node 2 fails is shown in FIG. 7(d). In this case, both node 1 and node 3 can ensure the same communication as the normal state by the same switching operation as the case in FIG. 7(c).

Figure 8:
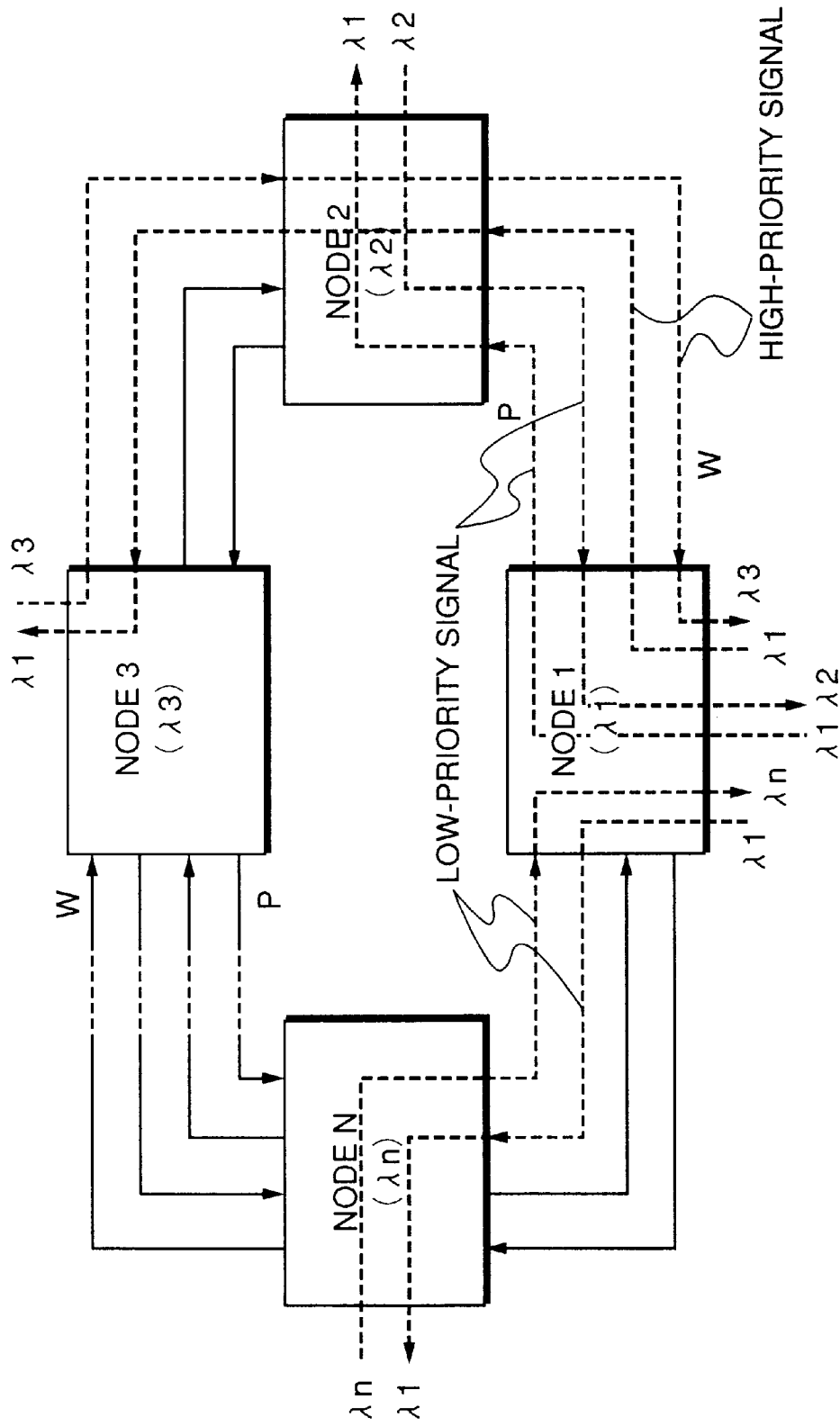
FIG. 8 is a schematic view showing how low-priority signals are transmitted when the protection transmission lines in the first embodiment of the present invention are used.

Furthermore, as shown in FIG. 8, in the normal state where no failure occurs in the system, protection transmission lines can be used, and when failure occurs and lines are switched, low-priority signals based on the assumption that communication is cut off can be transmitted.

Figure 9:
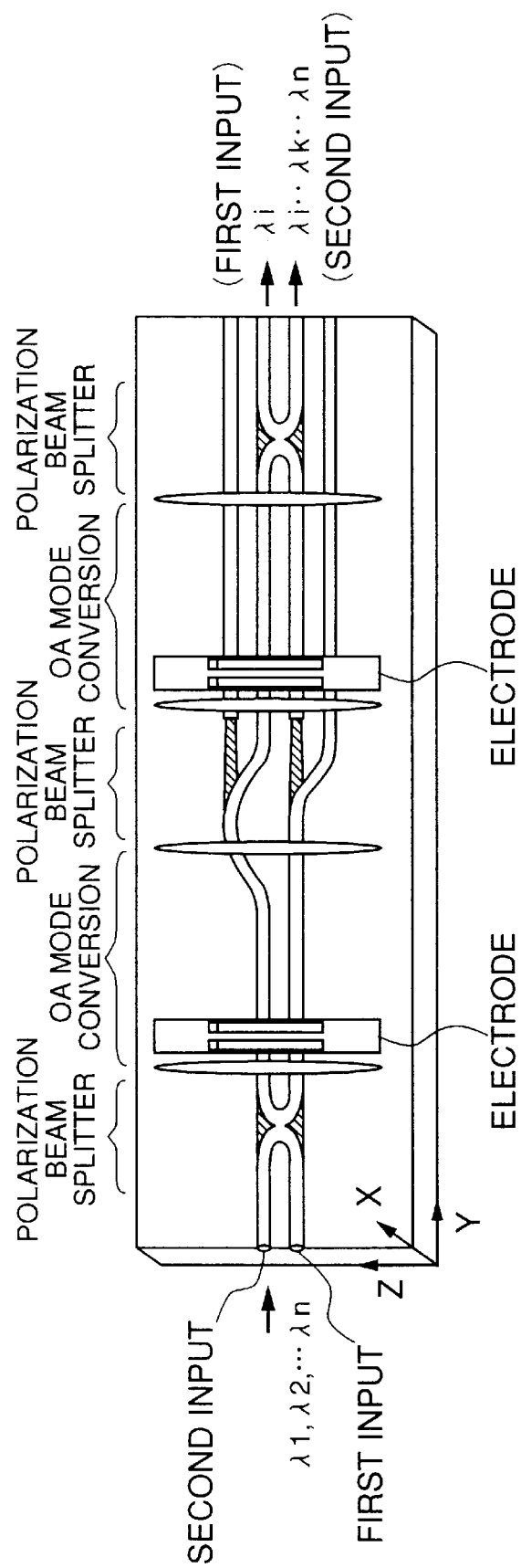
FIG. 9 is a perspective view showing an example of the variable wavelength filter used in the first embodiment of the present invention shown in FIG. 3.

Here, the variable wavelength filter used in FIG. 4 receives signals that are wavelength-division multiplexed, and separates an arbitrary wavelength from the other wavelengths. The variable wavelength filter outputs both the separated wavelength and the other wavelengths. At this time, the center wavelength of the wavelength separated by the variable wavelength filter is varied. As an example of the variable wavelength filter, in FIG. 9 there is shown a combination of waveguides, polarization beam splitters, acousto-optic polarization converters, and electrodes mounted on an LiNbO$_3$ substrate, as an acousto-optic tunable filter (AOTF). This element has two inputs and two outputs. In FIG. 9, when the optical signals of the multiplexed wavelengths λ1 through λn are input to the first input of the element, a frequency of near 170 MHz is applied to the electrodes, so that the output of the wavelength component λi corresponding to the frequency is obtained on the first output (filtered output), and the outputs of the wavelength components other than that are obtained on the second output (unfiltered output). In this AOTF, the input optical signals are initially separated into TE waves and TM waves by the first polarization beam splitter. At the acousto-optic polarization converter, only a specific wavelength component λi corresponding to the frequency applied to the electrode is converted from a TE wave to a TM wave and also from a TM wave to a TE wave. Next, polarization separation, polarization conversion, and polarization separation are repeated again, and finally, the wavelength component λi and the other wavelength components are separated and extracted.

In the case where this element is applied to the present invention, the wavelength control section 111 needs to output a frequency which varies in the vicinity of 170 MHz.

Figure 10:
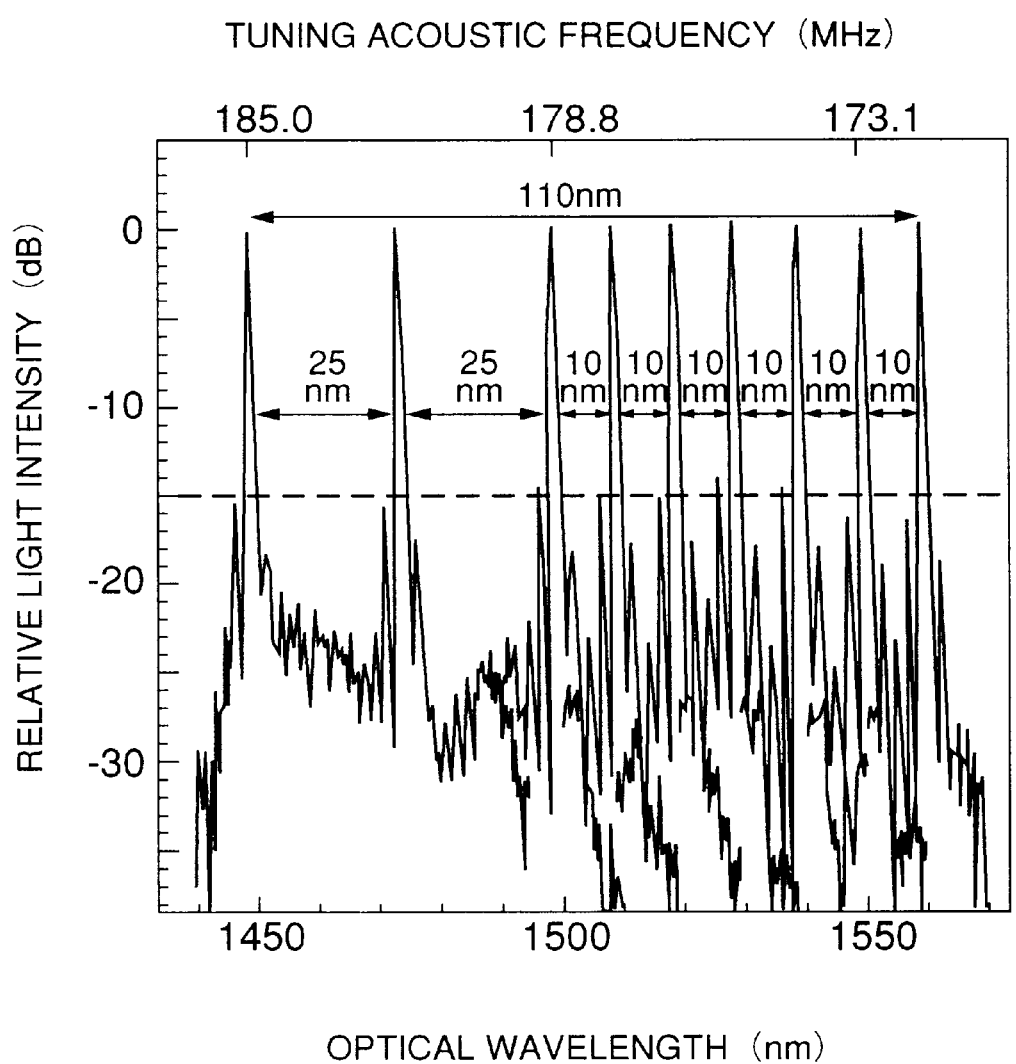
FIG. 10 is a graph showing an example of the characteristics of the variable wavelength filter shown in FIG. 9.

FIG. 10 illustrates an example of the transmitted wavelength characteristics of the AOTF. Since the element employed here has acousto-optic polarization converters at two stages, it has the feature that stable filter characteristics are obtainable, regardless of the states of polarization of input optical signals.

While the aforementioned description has been made of the case where optical signals are transmitted through transmission lines comprising optical fibers in both directions, a certain advantageous effect could be obtained with respect to the objects of the present invention, even if signals were transmitted in one direction.

Figure 11:
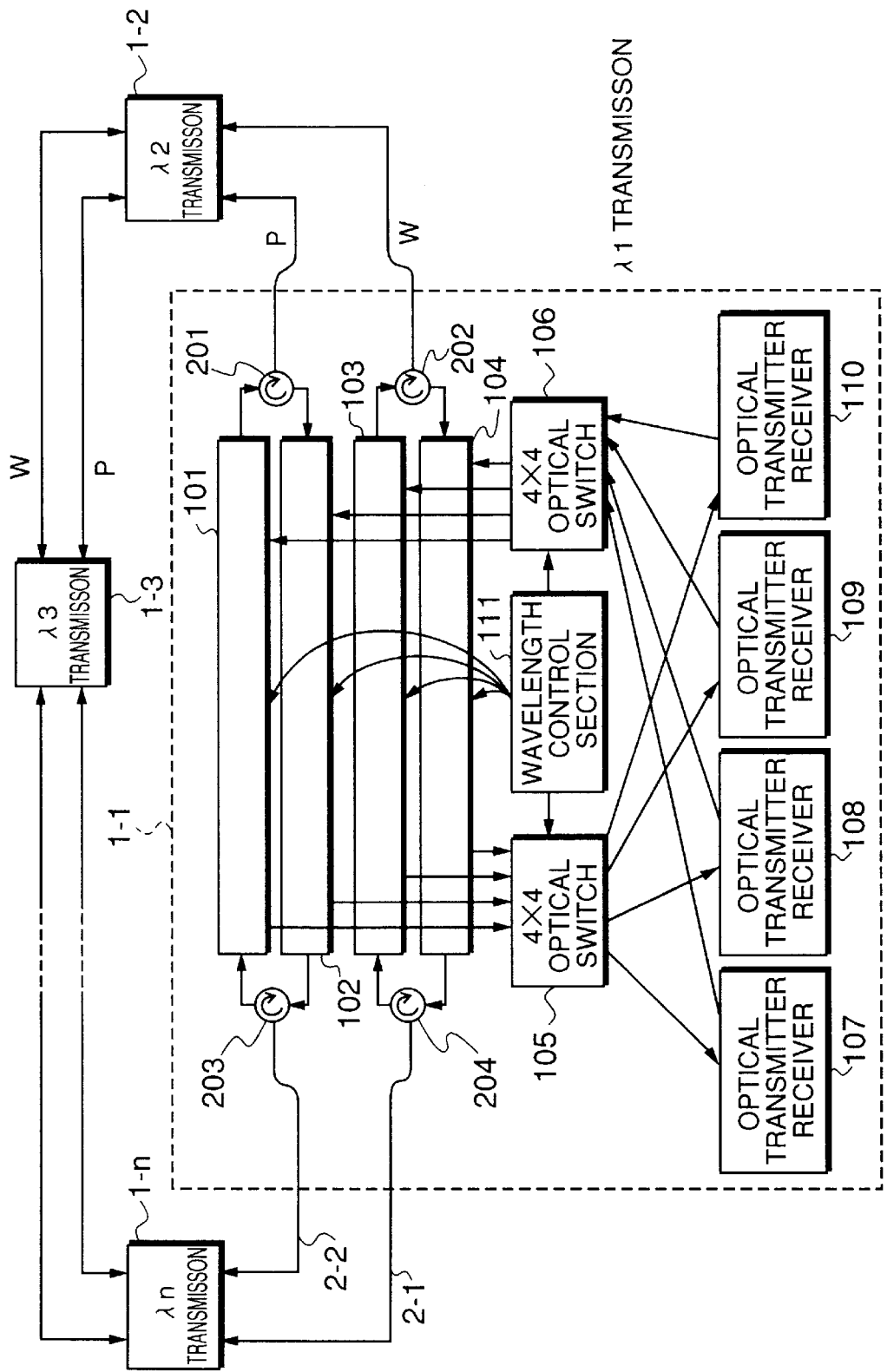
FIG. 11 is a schematic view showing a second embodiment of the optical wavelength-division multiplex transmission equipment with a ring structure of the present invention.

FIG. 11 schematically illustrates a second embodiment of the optical wavelength-division multiplex transmission equipment with a ring structure of the present invention. The same reference numerals will be applied to the same parts as FIG. 3 or corresponding parts. The second embodiment differs considerably from the first embodiment in that optical circulators 201 through 204 are employed.

The second embodiment shown in FIG. 11 reduces the four transmission lines of the optical transmission equipment shown in the first embodiment to two transmission lines. For the nodes, adjacent stations are interconnected with the two pairs of transmission lines, which are classified into two kinds of transmission lines: a working transmission line and a protection transmission line. With a single transmission line constituted by an optical fiber, both a clockwise signal and a counterclockwise signal are transmitted and the same function as the first embodiment is realized.

Four optical signals sent from optical transmission units 107 through 110 are input to wavelength channel add/drop sections 101 through 104 through an optical 4×4-matrix switch 106, respectively. The input optical signal of each wavelength channel add/drop section is optically coupled to the other wavelength components and then the coupled wavelength components are sent onto the transmission line. For example, the optical signal output from the wavelength channel add/drop section 101 is input only onto a transmission line by the optical circulator 201.

Conversely, the optical signals that are received from transmission lines are input to the wavelength channel add/drop sections 101 through 104 through the optical circulators 201 through 204. For example, the optical signal input from the transmission line to the optical circulator 201 is input only to the wavelength channel add/drop section 102.

Therefore, there is no possibility that the optical signal, input from the wavelength channel add/drop section 101 to the optical circulator 201, will be input to the wavelength channel add/drop section 102. In addition, there is no possibility that the optical signal input from the transmission line to the circulator 201 will be input to the wavelength channel add/drop section 101. For this reason, clockwise and counterclockwise signals can be separated from each other by nodes 1—1 through 1-n, and consequently, if only two optical fibers for transmission lines are used, the same function as the first embodiment can be realized.

Figure 12:
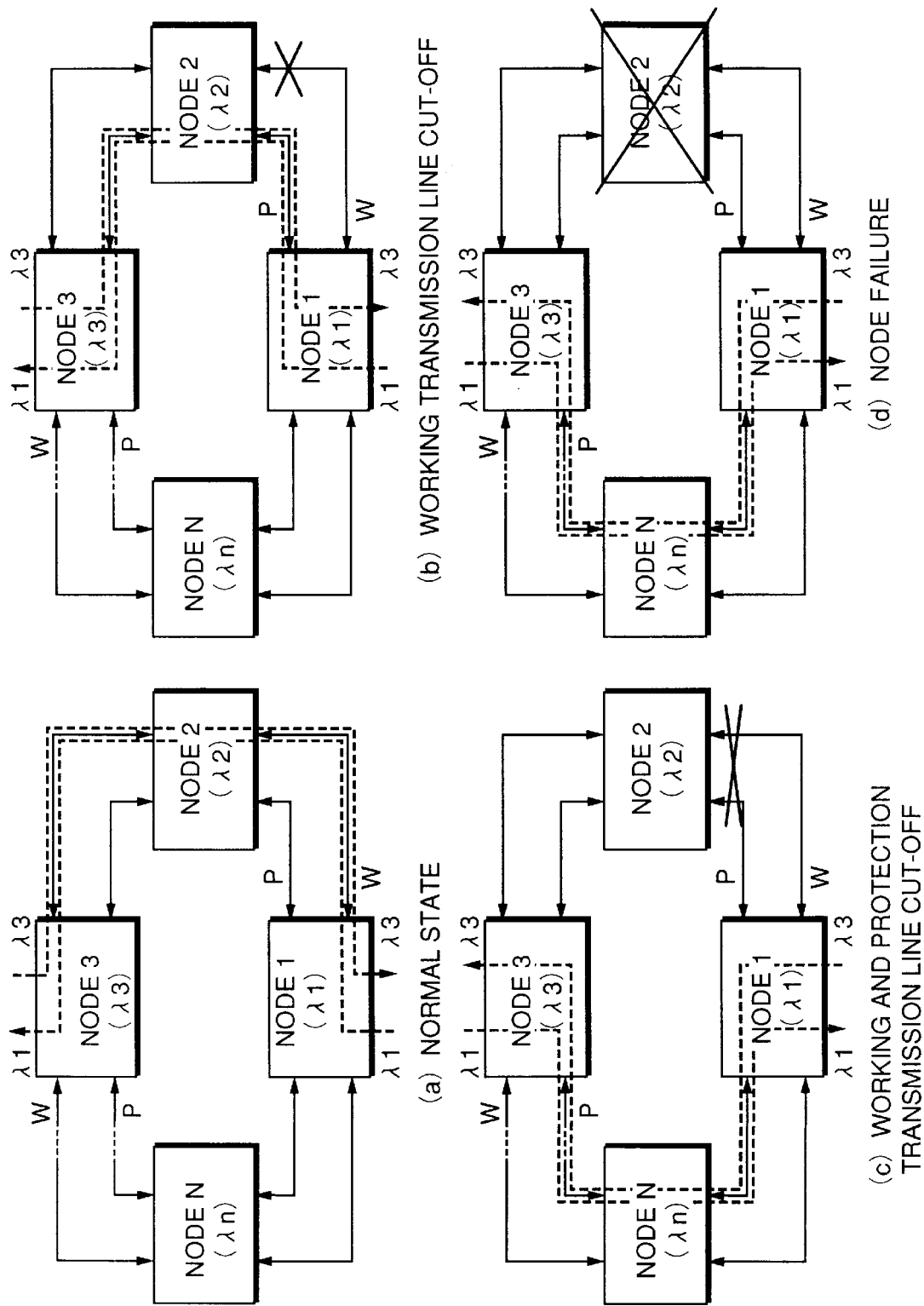
FIG. 12(a) is a schematic view showing how the communication in the second embodiment of the present invention is performed in a normal state.
FIG. 12(b) is a schematic view showing how the communication in the second embodiment is performed when the working transmission lines are cut off.
FIG. 12(c) is a schematic view showing how the communication in the second embodiment is performed when the working transmission lines and the protection transmission lines are cut off.
FIG. 12(d) is a schematic view showing how the communication in the second embodiment is performed when a certain node fails.

FIG. 12 shows the recovery operation of the second embodiment in the case where failure occurs on transmission lines.

As shown in FIG. 12(a), in a normal state, as with the first embodiment, nodes 1 and 3 use wavelengths $\lambda 1$ and $\lambda 3$ and perform communication through the working transmission line. As shown in FIG. 12(b), when the working transmission line is cut off, the working transmission line is switched to the protection transmission line of the same route as the case of FIG. 12(a). As shown in FIG. 12(c), when both the working transmission line and the protection transmission are cut off, the protection transmission line of a different route from the case of FIG. 12(a) is employed. As shown in FIG. 12(d), when node fails, the same switching operation as FIG. 12(c) is performed.

Figure 13:
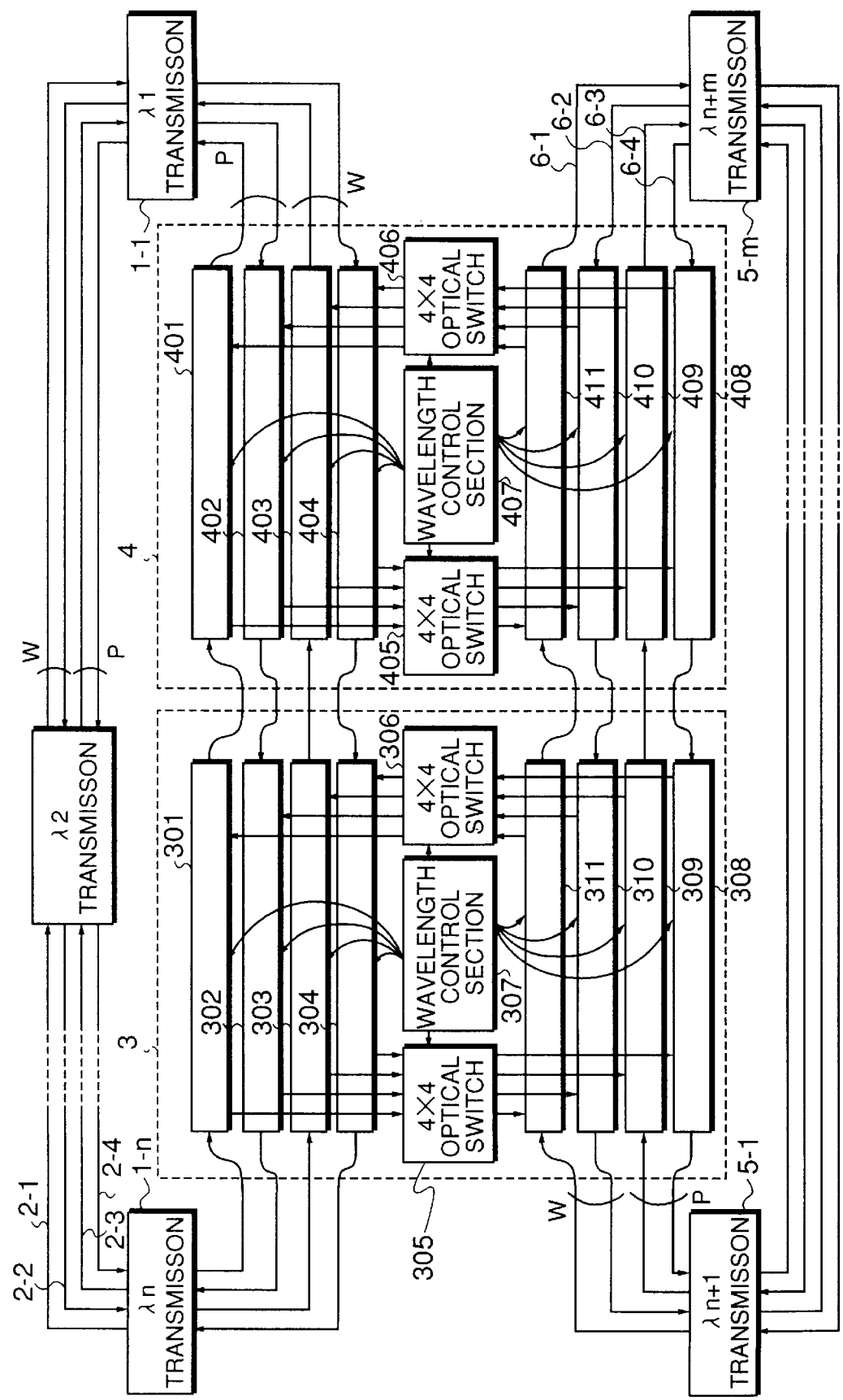
FIG. 13 is a schematic view showing a third embodiment of the optical wavelength-division multiplex transmission equipment with a ring structure of the present invention.

FIG. 13 shows a third embodiment of the present invention. In the figure, reference numerals 1—1 through 1-n denote optical add/drop nodes, and reference numerals 2-1 through 2-4 denote transmission lines comprising optical fibers (2-1: clockwise working transmission line, 2—2: counterclockwise working transmission line, 2-3: clockwise protection transmission line, and 2-4: counterclockwise protection transmission line). 3 and 4 are ring connecting nodes. 5-1 through 5-m are optical add/drop nodes, and 6-1 through 6-4 are transmission lines comprising optical fibers (6-1: clockwise working transmission line, 6-2: counterclockwise working transmission line, 6-3: clockwise protection transmission line, and 6-4: counterclockwise protection transmission line). 301 through 304 are wavelength channel add/drop sections, and 305 and 306 are optical 4×4-matrix switches. 307 is a wavelength control section, and 308 through 311 are wavelength channel add/drop sections. 401 through 404 are wavelength channel add/drop sections, 405 and 406 are optical 4×4-matrix switches, 407 is a wavelength control section, and 408 through 411 are wavelength channel add/drop sections.

In FIG. 13 the nodes 1—1 through 1-n and the nodes 5-1 through 5-m have functions equivalent to the optical add/drop nodes in the first embodiment. In the figure, nodes 1—1 through 1-n constitute a first optical ring through the transmission lines 2-1 through 2-4 and the ring connecting nodes 3 and 4, and nodes 5-1 through 5-m constitute a second optical ring through the transmission lines 6-1 through 6-4 and the ring connecting nodes 3 and 4.

The third embodiment expands the network by interconnecting the first optical ring and the second optical ring.

A description will be made of the case where communication is performed between the node within the first optical ring and the node within the second optical ring through the ring connecting node 3.

In the case where any one of the wavelength components $\lambda 1$ through $\lambda n$ in the first optical ring is transmitted to the second optical ring, a desired wavelength component is separated by the wavelength channel add/drop section which is connected to the transmission line through which the wavelength component to be transmitted is transmitted, among the wavelength channel add/drop sections 301 through 304 in the ring connecting node 3. The separated wavelength component is input to the optical 4×4-matrix switch 305. The optical matrix switch 305 selects a wavelength channel add/drop section, which corresponds to the transmission line of the second optical ring to which the separated wavelength component is sent, from the wavelength channel add/drop sections 311 through 308. The selected wavelength channel add/drop section is connected. In this way, the signal in the first optical ring can be transmitted to the second optical ring. Conversely, the wavelength components $\lambda n+1$ through $\lambda n+m$ in the second optical ring can also be transmitted to the first optical ring.

Figure 14:
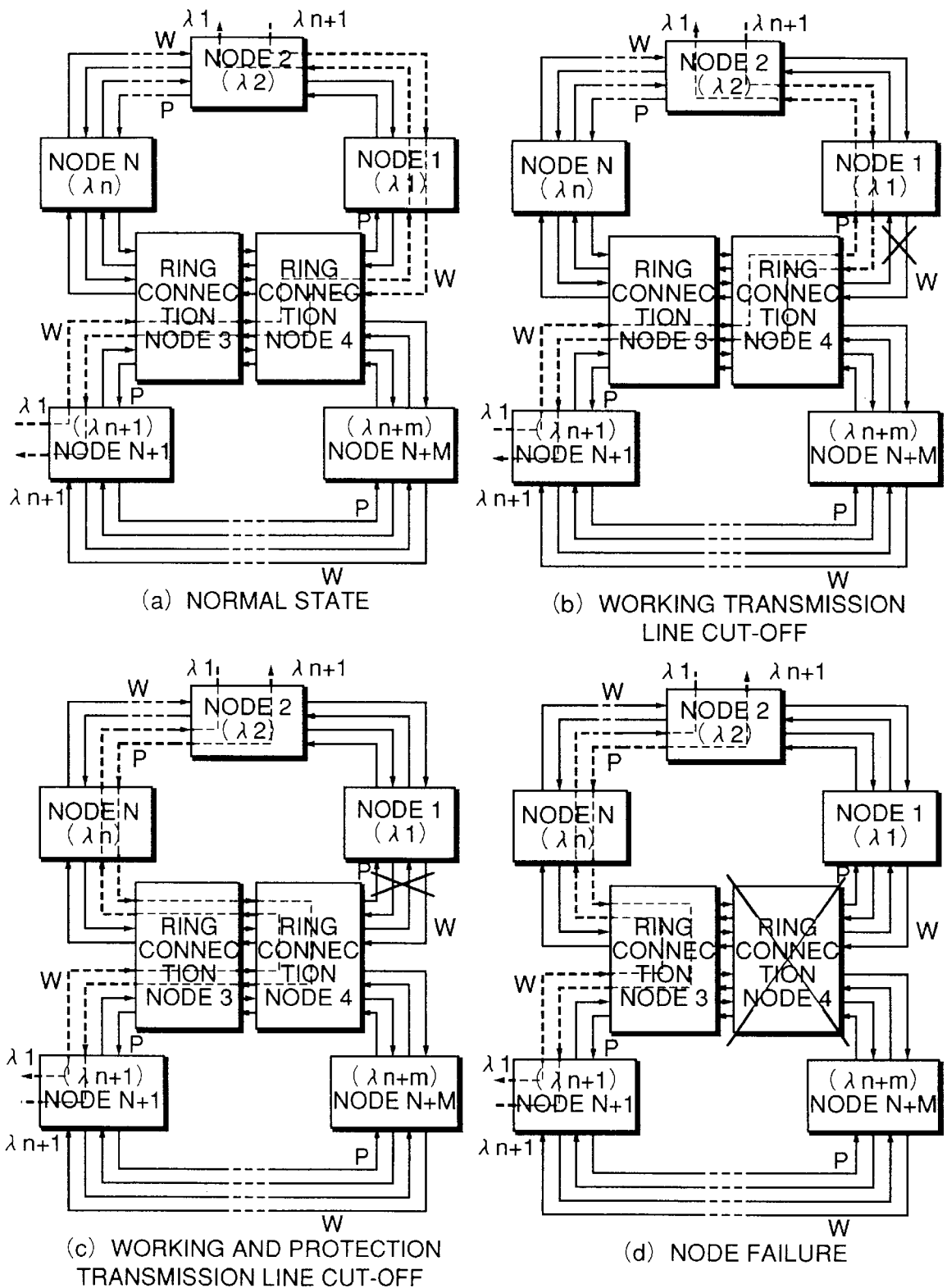
FIG. 14(a) is a schematic view showing how the communication in the third embodiment of the present invention is performed in a normal state.
FIG. 14(b) is a schematic view showing how the communication in the third embodiment is performed when the working transmission lines are cut off.
FIG. 14(c) is a schematic view showing how the communication in the third embodiment is performed when the working transmission lines and the protection transmission lines are cut off.
FIG. 14(d) is a schematic view showing how the communication in the third embodiment is performed when a certain node fails.

A description will next be made of the recovery operation of the third embodiment in the case where failure occurs on transmission lines, in reference to FIG. 14.

As shown in FIG. 14(a), assume that in a normal state, communication is performed between the node 2 of the first optical ring and the node n+1 of the second optical ring through lines such as those shown in the figure, using wavelengths $\lambda 2$ and $\lambda n+1$. As shown in FIG. 14(b), when working transmission lines are cut off between the node 1 and the ring connecting node 4, only the working transmission lines in the first optical ring are switched to the protection transmission lines of the same route as FIG. 14(a). As shown in FIG. 14(c), when both the working and protection transmission lines are cut off between the node 1 and the ring connecting node 4, only the working lines in the first optical ring are switched to the protection transmission lines of the opposite route from FIG. 14(a). As shown in FIG. 14(d), when the ring connecting node 4 fails, the switch operation is performed so that the first and second optical rings are interconnected with the node 3, using a route without the ring connecting node 4.

In the first structure of the present invention, as previously described, a single wavelength component is assigned to each node and transmitted onto four transmission lines. For this reason, all wavelength components can be used as service wavelengths without setting protection wavelengths. Therefore, wavelength components can be effectively used. Additionally, the wavelength band to be used can be minimized. Furthermore, the number of selected wavelengths in the wavelength selecting section can be minimized.

In the first structure, when a transmission line fails, both a clockwise route and a counterclockwise route can be employed by selecting protection transmission lines at both the transmitting side and the receiving side, so that the first structure is excellent in reliability.

Furthermore, since the protection transmission lines can transmit low-priority signals in a normal state, there is the advantage that the transmission efficiency is high.

According to the second structure of the present invention, clockwise and counterclockwise signals are multiplexed or demultiplexed by optical circulators. Therefore, in addition to the advantage of the first structure, the number of transmission lines to be used can be reduced by half, and the second structure has the advantage that the transmission efficiency is further enhanced as compared with the first embodiment.

According to the third structure of the present invention, two optical ring systems can be interconnected without reducing reliability. Therefore, in addition to the aforementioned advantage in the first structure, the third structure can construct flexible networks and has the advantage that it is excellent in operability.

While this invention has been described in connection with certain preferred embodiments thereof, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. Optical wavelength-division multiplex transmission equipment with a ring structure, comprising:

a plurality of nodes; and an optical fiber transmission line for connecting said plurality of nodes in the form of a ring; and wherein said optical fiber transmission line comprises at least two optical working fibers including a first optical working fiber and a second optical working fiber for transmitting optical signals in opposite directions; and wherein each of said nodes comprises:

at least two optical signal selecting means provided respectively in correspondence with said two optical working fibers for selecting an optical signal of an arbitrary single wavelength from said optical signals and outputting the selected optical signal;

at least two optical signal adding means provided respectively in correspondence with said two optical working fibers for adding an optical transmission signal of a previously set wavelength to said optical signals and sending the optical transmission signal onto the corresponding optical fiber transmission line;

at least two optical signal receiving means for receiving said selected optical signal;

first transmission line switch means arranged between said optical signal selecting means and said optical signal receiving means for switching the transmission line of said selected optical signal and outputting said selected optical signal to said optical signal receiving means;

at least two optical signal transmitting means for outputting said optical transmission signal;

second transmission line switch means for switching the transmission line of said optical transmission signal and outputting said optical transmission signal to said optical signal adding means; and transmission line switch control means for respectively controlling the transmission line switching operations of said first transmission line switch means and said second transmission line switch means.

2. Optical wavelength-division multiplex transmission equipment with a ring structure, comprising:

a plurality of nodes; and an optical fiber transmission line for connecting said plurality of nodes in the form of a ring; and wherein said optical fiber transmission line comprises:

at least two optical working fibers including a first optical working fiber and a second optical working fiber for transmitting optical signals in opposite directions; and at least two optical protection fibers including a first optical protection fiber and a second optical protection fiber for transmitting optical signals in opposite directions; and wherein each of said nodes comprises:

at least four optical signal selecting means provided respectively in correspondence with said two optical working fibers and said two optical protection fibers for selecting an optical signal of an arbitrary single wavelength from said optical signals and outputting the selected optical signal;

at least four optical signal adding means provided respectively in correspondence with said two optical working fibers and said two optical protection fibers for adding an optical transmission signal of a previously set wavelength to said optical signals and sending the optical transmission signal onto the corresponding optical fiber transmission line;

at least four optical signal receiving means for receiving said selected optical signal;

a first optical matrix switch arranged between said optical signal selecting means and said optical signal receiving means for switching a transmission line to which said selected optical signal is input and connected and for outputting said selected optical signal to said optical signal receiving means;

at least four optical signal transmitting means for outputting said optical transmission signal;

a second optical matrix switch for switching a transmission line to which said optical transmission signal is input and connected and for outputting said optical transmission signal to the corresponding optical signal adding means; and optical matrix switch control means for respectively controlling the transmission line switching operations of said first optical matrix switch and said second optical matrix switch.

3. The optical wavelength-division multiplex transmission equipment with a ring structure as set forth in claim 2, wherein the wavelengths of said optical signals are assigned individually to said nodes, respectively.

4. The optical wavelength-division multiplex transmission equipment with a ring structure as set forth in claim 3, wherein said optical signal selecting means includes a variable wavelength filter.

5. The optical wavelength-division multiplex transmission equipment with a ring structure as set forth in claim 4, wherein said optical signal selecting means is provided with optical amplification means for amplifying said optical signal at the previous stage of said variable wavelength filter.

6. The optical wavelength-division multiplex transmission equipment with a ring structure as set forth in claim 4, wherein said variable wavelength filter is an acousto-optic variable wavelength filter.

7. The optical wavelength-division multiplex transmission equipment with a ring structure as set forth in claim 3, wherein said optical signal adding means includes an optical multiplexer.

8. The optical wavelength-division multiplex transmission equipment with a ring structure as set forth in claim 7, wherein said optical signal adding means is provided with optical amplification means for amplifying said optical transmission signal and said optical signal at the following stage of said optical multiplexer.

9. Optical wavelength-division multiplex transmission equipment with a ring structure, comprising:

a plurality of nodes; and an optical fiber transmission line for connecting said plurality of nodes in the form of a ring; and wherein said optical fiber transmission line comprises an optical working fiber for transmitting optical signals in a forward direction and a reverse direction; and wherein each of said nodes comprises:

first optical signal selecting/adding means connected to said optical working fiber for selecting an optical signal of an arbitrary single wavelength from said optical signals transmitted in said forward direction and outputting the selected optical signal and also connected to said optical working fiber for adding an optical transmission signal of a previously set wavelength to said optical signals and sending the optical transmission signal onto the corresponding optical fiber transmission line;

second optical signal selecting/adding means connected to said optical working fiber for selecting an optical signal of an arbitrary single wavelength from said optical signals transmitted in said reverse direction and outputting the selected optical signal and also connected to said optical working fiber for adding an optical transmission signal of a previously set wavelength to said optical signals and sending the optical transmission signal onto the corresponding optical fiber transmission line;

a first optical circulator for outputting the optical signal, which is transmitted through said optical fiber transmission line in said forward direction, to said first optical signal selecting/adding means and also for sending the optical transmission signal, which is output from said second optical signal selecting/adding means, onto said optical fiber transmission line;

a second optical circulator for outputting the optical signal, which is transmitted through said optical fiber transmission line in said reverse direction, to said second optical signal selecting/adding means and also for sending the optical transmission signal, which is output from said first optical signal selecting/adding means, onto said optical fiber transmission line;

at least two optical signal receiving means for receiving said selected optical signal;

first transmission line switch means arranged between said first and second optical signal selecting/adding means and said optical signal receiving means for switching the transmission line of said selected optical signal and outputting said selected optical signal to said optical signal receiving means;

at least two optical signal transmitting means for outputting said optical transmission signal;

second transmission line switch means for switching the transmission line of said optical transmission signal and outputting said optical transmission signal to said first optical signal selecting/adding means and said second optical signal selecting/adding means; and transmission line switch control means for respectively controlling the transmission line switching operations of said first transmission line switch means and said second transmission line switch means.

10. Optical wavelength-division multiplex transmission equipment with a ring structure, comprising:

a plurality of nodes; and an optical fiber transmission line for connecting said plurality of nodes in the form of a ring; and wherein said optical transmission line comprises an optical working fiber for transmitting optical signals in a forward direction and a reverse direction and an optical protection fiber for transmitting optical signals in a forward direction and a reverse direction; and wherein each of said nodes comprises:

first optical signal selecting/adding means connected to said optical working fiber for selecting an optical signal of an arbitrary single wavelength from said optical signals transmitted in said forward direction and outputting the selected optical signal and also connected to said optical working fiber for adding an optical transmission signal of a previously set wavelength to said optical signals and sending the optical transmission signal onto the corresponding optical fiber transmission line;

second optical signal selecting/adding means connected to said optical working fiber for selecting an optical signal of an arbitrary single wavelength from said optical signals transmitted in said reverse direction and outputting the selected optical signal and also connected to said optical working fiber for adding an optical transmission signal of a previously set wavelength to said optical signals and sending the optical transmission signal onto the corresponding optical fiber transmission line;

third optical signal selecting/adding means connected to said optical working fiber for selecting an optical signal of an arbitrary single wavelength from said optical signals transmitted in said forward direction and outputting the selected optical signal and also connected to said optical working fiber for adding an optical transmission signal of a previously set wavelength to said optical signals and sending the optical transmission signal onto the corresponding optical fiber transmission line;

fourth optical signal selecting/adding means connected to said optical working fiber for selecting an optical signal of an arbitrary single wavelength from said optical signals transmitted in said reverse direction and outputting the selected optical signal and also connected to said optical working fiber for adding an optical transmission signal of a previously set wavelength to said optical signals and sending the optical transmission signal onto the corresponding optical fiber transmission line;

a first optical circulator for outputting the optical signal, which is transmitted through said optical fiber transmission line in said forward direction, to said first optical signal selecting/adding means and also for sending the optical transmission signal, which is output from said second optical signal selecting/adding means, onto said optical fiber transmission line;

a second optical circulator for outputting the optical signal, which is transmitted through said optical fiber transmission line in said reverse direction, to said second optical signal selecting/adding means and also for sending the optical transmission signal, which is output from said first optical signal selecting/adding means, onto said optical fiber transmission line;

a third optical circulator for outputting the optical signal, which is transmitted through said optical fiber transmission line in said forward direction, to said third optical signal selecting/adding means and also for sending the optical transmission signal, which is output from said fourth optical signal selecting/adding means, onto said optical fiber transmission line;

a fourth optical circulator for outputting the optical signal, which is transmitted through said optical fiber transmission line in said reverse direction, to said fourth optical signal selecting/adding means and also for sending the optical transmission signal, which is output from said third optical signal selecting/adding means, onto said optical fiber transmission line;

at least four optical signal receiving means for receiving said selected optical signal;

first optical matrix switch arranged between said first, second, third, and fourth optical signal selecting/adding means and said optical signal receiving means for switching the transmission line of said selected optical signal and outputting said selected optical signal to said optical signal receiving means;

at least four optical signal transmitting means for outputting said optical transmission signal;

second optical matrix switch for switching the transmission line of said optical transmission signal and outputting said optical transmission signal to said first optical signal selecting/adding means, said second optical signal selecting/adding means, said third optical signal selecting/adding means, and said fourth optical signal selecting/adding means; and optical matrix switch control means for respectively controlling the transmission line switching operations of said first optical matrix switch and said second optical matrix switch.

11. The optical wavelength-division multiplex transmission equipment with a ring structure as set forth in claim 9, wherein the wavelengths of said optical signals are assigned individually to said nodes, respectively.

12. The optical wavelength-division multiplex transmission equipment with a ring structure as set forth in claim 10, wherein the wavelengths of said optical signals are assigned individually to said nodes, respectively.

13. The optical wavelength-division multiplex transmission equipment with a ring structure as set forth in claim 11, wherein said optical signal selecting/adding means includes a variable wavelength filter.

14. The optical wavelength-division multiplex transmission equipment with a ring structure as set forth in claim 12, wherein said optical signal selecting/adding means is provided with optical amplification means for amplifying said optical signal at the previous stage of said variable wavelength filter.

15. The optical wavelength-division multiplex transmission equipment with a ring structure as set forth in claim 13, wherein said variable wavelength filter is an acousto-optic variable wavelength filter.

16. The optical wavelength-division multiplex transmission equipment with a ring structure as set forth in claim 11, wherein said optical signal selecting/adding means includes an optical multiplexer.

17. The optical wavelength-division multiplex transmission equipment with a ring structure as set forth in claim 16, wherein said optical signal selecting/adding means is provided with optical amplification means for amplifying said optical transmission signal and said optical signal at the following stage of said optical multiplexer.

18. Optical wavelength-division multiplex transmission equipment with a ring structure, comprising:

a plurality of sets of optical wavelength-division multiplex transmission equipment with a ring structure as set forth in claim 1; and a ring connecting node for interconnecting the optical wavelength-division multiplex transmission equipment with a first ring structure and the optical wavelength-division multiplex transmission equipment with a second ring structure which are adjacent to each other among said plurality of sets of optical wavelength-division multiplex transmission equipment with a ring structure; and wherein said ring connecting node comprises:

a first set of at least two connecting node signal selecting means which are provided respectively in correspondence with said two optical working fibers in said optical wavelength-division multiplex transmission equipment with a first ring structure and which select an optical signal of an arbitrary single wavelength from said optical signals and also output a first connecting node selection signal;

a first set of at least two connecting node signal adding means which are provided respectively in correspondence with said two optical working fibers in said optical wavelength-division multiplex transmission equipment with a first ring structure and which add said optical signal to said optical signals and also output said optical signal onto the corresponding optical fiber transmission line;

a second set of at least two connecting node signal selecting means which are provided respectively in correspondence with said two optical working fibers in said optical wavelength-division multiplex transmission equipment with a second ring structure and which select an optical signal of an arbitrary single wavelength from said optical signals and also output a second connecting node selection signal;

a second set of at least two connecting node signal adding means which are provided respectively in correspondence with said two optical working fibers in said optical wavelength-division multiplex transmission equipment with a second ring structure and which add said optical signal to said optical signals and also output said optical signal onto the corresponding optical fiber transmission line;

first connecting node transmission line switch means arranged between said first connecting node signal selecting means and said second connecting node signal adding means for switching the transmission line of said first connecting node selection signal;

second connecting node transmission line switch means arranged between said second connecting node signal selecting means and said first connecting node signal adding means for switching the transmission line of said second connecting node selection signal; and connecting node transmission line switch control means for controlling said first connecting node transmission line switch means, said second connecting node transmission line switch means, and the switching of the transmission line.

19. Optical wavelength-division multiplex transmission equipment with a ring structure, comprising:

a plurality of sets of optical wavelength-division multiplex transmission equipment with a ring structure as set forth in claim 9; and a ring connecting node for interconnecting the optical wavelength-division multiplex transmission equipment with a first ring structure and the optical wavelength-division multiplex transmission equipment with a second ring structure which are adjacent to each other among said plurality of sets of optical wavelength-division multiplex transmission equipment with a ring structure; and wherein said ring connecting node comprises:

a first set of at least two connecting node signal selecting means which are provided respectively in correspondence with said two optical working fibers in said optical wavelength-division multiplex transmission equipment with a first ring structure and which select an optical signal of an arbitrary single wavelength from said optical signals and also output a first connecting node selection signal;

a first set of at least two connecting node signal adding means which are provided respectively in correspondence with said two optical working fibers in said optical wavelength-division multiplex transmission equipment with a first ring structure and which add said optical signal to said optical signals and also output said optical signal onto the corresponding optical fiber transmission line;

a second set of at least two connecting node signal selecting means which are provided respectively in correspondence with said two optical working fibers in said optical wavelength-division multiplex transmission equipment with a second ring structure and which select an optical signal of an arbitrary single wavelength from said optical signals and also output a second connecting node selection signal;

a second set of at least two connecting node signal adding means which are provided respectively in correspondence with said two optical working fibers in said optical wavelength-division multiplex transmission equipment with a second ring structure and which add said optical signal to said optical signals and also output said optical signal onto the corresponding optical fiber transmission line;

first connecting node transmission line switch means arranged between said first connecting node signal selecting means and said second connecting node signal adding means for switching the transmission line of said first connecting node selection signal;

second connecting node transmission line switch means arranged between said second connecting node signal selecting means and said first connecting node signal adding means for switching the transmission line of said second connecting node selection signal; and connecting node transmission line switch control means for controlling said first connecting node transmission line switch means, said second connecting node transmission line switch means, and the switching of the transmission line.

20. Optical wavelength-division multiplex transmission equipment with a ring structure, comprising:

a plurality of sets of optical wavelength-division multiplex transmission equipment with a ring structure as set forth in claim 2; and a ring connecting node for interconnecting the optical wavelength-division multiplex transmission equipment with a first ring structure and the optical wavelength-division multiplex transmission equipment with a second ring structure which are adjacent to each other among said plurality of sets of optical wavelength-division multiplex transmission equipment with a ring structure; and wherein said ring connecting node comprises:

a first set of at least two connecting node signal selecting means which are provided respectively in correspondence with said two optical working fibers and said two optical protection fibers in said optical wavelength-division multiplex transmission equipment with a first ring structure and which select an optical signal of an arbitrary single wavelength from said optical signals and also output a first connecting node selection signal;

a first set of at least two connecting node signal adding means which are provided respectively in correspondence with said two optical working fibers and said two optical protection fibers in said optical wavelength-division multiplex transmission equipment with a first ring structure and which add an optical transmission signal to said optical signals and also output said optical transmission signal onto the corresponding optical fiber transmission line;

a second set of at least two connecting node signal selecting means which are provided respectively in correspondence with said two optical working fibers and said two optical protection fibers in said optical wavelength-division multiplex transmission equipment with a second ring structure and which select an optical signal of an arbitrary single wavelength from the optical transmission signals and also output a second connecting node selection signal;

a second set of at least two connecting node signal adding means which are provided respectively in correspondence with said two optical working fibers and said two optical protection fibers in said optical wavelength-division multiplex transmission equipment with a second ring structure and which add an optical transmission signal to said optical signals and also output said optical transmission signal onto the corresponding optical fiber transmission line;

a first connecting node matrix switch arranged between said first connecting node signal selecting means and said second connecting node signal adding means for switching the transmission line of said first connecting node selection signal;

a second connecting node matrix switch arranged between said second connecting node signal selecting means and said first connecting node signal adding means for switching the transmission line of said second connecting node selection signal; and connecting node matrix switch control means for controlling said first connecting node matrix switch, said second connecting node matrix switch, and the switching of the transmission line.

21. Optical wavelength-division multiplex transmission equipment with a ring structure, comprising:

a plurality of sets of optical wavelength-division multiplex transmission equipment with a ring structure as set forth in claim 10; and a ring connecting node for interconnecting the optical wavelength-division multiplex transmission equipment with a first ring structure and the optical wavelength-division multiplex transmission equipment with a second ring structure which are adjacent to each other among said plurality of sets of optical wavelength-division multiplex transmission equipment with a ring structure; and wherein said ring connecting node comprises:

a first set of at least two connecting node signal selecting means which are provided respectively in correspondence with said two optical working fibers and said two optical protection fibers in said optical wavelength-division multiplex transmission equipment with a first ring structure and which select an optical signal of an arbitrary single wavelength from said optical signals and also output a first connecting node selection signal;

a first set of at least two connecting node signal adding means which are provided respectively in correspondence with said two optical working fibers and said two optical protection fibers in said optical wavelength-division multiplex transmission equipment with a first ring structure and which add an optical transmission signal to said optical signals and also output said optical transmission signal onto the corresponding optical fiber transmission line;

a second set of at least two connecting node signal selecting means which are provided respectively in correspondence with said two optical working fibers and said two optical protection fibers in said optical wavelength-division multiplex transmission equipment with a second ring structure and which select an optical signal of an arbitrary single wavelength from the optical transmission signals and also output a second connecting node selection signal;

a second set of at least two connecting node signal adding means which are provided respectively in correspondence with said two optical working fibers and said two optical protection fibers in said optical wavelength-division multiplex transmission equipment with a second ring structure and which add an optical transmission signal to said optical signals and also output said optical transmission signal onto the corresponding optical fiber transmission line;

a first connecting node matrix switch arranged between said first connecting node signal selecting means and said second connecting node signal adding means for switching the transmission line of said first connecting node selection signal;

a second connecting node matrix switch arranged between said second connecting node signal selecting means and said first connecting node signal adding means for switching the transmission line of said second connecting node selection signal; and connecting node matrix switch control means for controlling said first connecting node matrix switch, said second connecting node matrix switch, and the switching of the transmission line.

\* \* \* \* \*